US011002622B2

(12) United States Patent
Carini

(10) Patent No.: US 11,002,622 B2
(45) Date of Patent: May 11, 2021

(54) SINGLE-WIRE TRANSMISSION OF SENSOR DATA

(71) Applicant: Simmonds Precision Products, Inc., Vergennes, VT (US)

(72) Inventor: Peter J. Carini, Underhill, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 517 days.

(21) Appl. No.: 15/402,686

(22) Filed: Jan. 10, 2017

(65) Prior Publication Data

US 2018/0195917 A1 Jul. 12, 2018

(51) Int. Cl.
| | | |
|---|---|---|
| *G01L 5/04* | (2006.01) | |
| *G01L 5/10* | (2020.01) | |
| *B64D 1/22* | (2006.01) | |
| *B66C 1/40* | (2006.01) | |

(52) U.S. Cl.
CPC .............. *G01L 5/047* (2013.01); *B64D 1/22* (2013.01); *B66C 1/40* (2013.01); *G01L 5/10* (2013.01)

(58) Field of Classification Search
CPC ..... G01L 2203/028; G01L 5/047; G01L 5/10; B64D 1/22; B66C 1/40; B66C 1/409; B66C 13/16
USPC ..................................................... 73/862.391
See application file for complete search history.

(56) References Cited

U.S. PATENT DOCUMENTS

| | | | | |
|---|---|---|---|---|
| 4,193,129 A | * | 3/1980 | Wiggins ................. | G01S 7/521 |
| | | | | 320/137 |
| 9,274,011 B2 | * | 3/2016 | Kettenbach .............. | B66C 1/40 |
| 2013/0054054 A1 | | 2/2013 | Tollenaere et al. | |
| 2016/0009393 A1 | | 1/2016 | Repp et al. | |

FOREIGN PATENT DOCUMENTS

| | | |
|---|---|---|
| CN | 2593817 Y | 12/2003 |
| DE | 102007049819 A1 | 4/2009 |
| EP | 2708864 A2 | 3/2014 |
| FR | 2901548 A1 | 11/2007 |
| JP | H09286397 * | 4/1997 |
| WO | 2016/007796 A1 | 1/2016 |

OTHER PUBLICATIONS

Extended European Patent Search Report issued in corresponding European Patent Application No. EP 18150717.9, dated May 28, 2018.

* cited by examiner

*Primary Examiner* — Octavia Hollington
(74) *Attorney, Agent, or Firm* — Locke Lord LLP; Joshua L. Jones; Scott D. Wofsy

(57) ABSTRACT

A hoist system includes a load attaching member a single conductor connecting the load attaching member to a hoist for raising and lowering the load attaching member and single conductor. A sensor is operatively connected to the load attaching member to sense a monitored parameter of the load attaching member. The sensor is electrically connected to a receiving module of the hoist for single wired-transmission along the single conductor from the sensor to the receiving module.

17 Claims, 2 Drawing Sheets

1

SINGLE-WIRE TRANSMISSION OF SENSOR DATA

BACKGROUND OF THE INVENTION

1. Field of the Invention

The present disclosure relates to data transmission, and more particularly to data transmission such as for sensors in hoists for aerospace systems, cranes, winches, elevators, suspension structures, and the like.

2. Description of Related Art

Helicopter-hoist equipment today typically includes a lifting device such as a hoist, which is attached to the helicopter, a hoist cable, and a hook located at the distal end of the cable for direct or indirect attachment to a person, animal, or object for rescue. The hoist usually has a rotary drum for winding in and out the cable that serves to lift or transport the load. A crew member in the helicopter usually controls the raising and lowering of the hook. Considerations for helicopter hoists, or hoists used in cranes, winches, elevators, suspension structures, and the like, typically include a lack of real-time information about the weight and stresses being exerted on the hoist-rescue system during a rescue.

The conventional techniques have been considered satisfactory for their intended purpose. However, there is an ever present need for improved sensor systems and transmission of sensor data for hoists. This disclosure provides a solution for this problem.

SUMMARY OF THE INVENTION

A hoist system includes a load attaching member a single conductor connecting the load attaching member to a hoist for raising and lowering the load attaching member and the single conductor. A sensor is operatively connected to the load attaching member to sense a monitored parameter of the load attaching member. The sensor is electrically connected to a receiving module of the hoist for single wired-transmission along the single conductor from the sensor to the receiving module.

All power and/or data transmission between the sensor and the receiving module can be conducted along the single conductor. The single conductor can be connected as a monopole between the sensor and the receiving module without a second conductor completing a closed circuit between the sensor and the receiving module. The single conductor can form an open circuit between the sensor and the receiving module.

The sensor can be configured to generate sensor data for the monitored parameter, transform the sensor data into a wave of time-variant electrical charge densities, and transmit the wave of time variant electrical charge densities along the single conductor. The receiving module can be configured to receive the wave of time variant electrical charge densities from the single conductor and extract the sensor data from the wave of time variant electrical charge densities.

The sensor can be configured for monitoring the monitored parameter optically and or electrically. It is also contemplated that the sensor can be configured to generate analog and/or digital sensor data. The sensor can be configured for monitoring one or more loads on the load attaching member as the monitored parameter. The sensor can include a stress sensing element for sensing loads locally at the load attaching member. The hoist system can include a second stress sensing element at a receiving module end of the single conductor opposite the load attaching member for sensing loads on the single conductor proximate the hoist.

The hoist can be configured to be mounted to at least one of an aircraft, a crane, a winch, an elevator, or a suspension structure. The receiving module can be configured for health monitoring the load attaching member, single conductor, and hoist based on sensor data from the sensor.

An aircraft includes an airframe and a hoist system as described above. A method includes transmitting data from a sensor configured to monitor at least one parameter of a hoist system along a cable having only a single conductor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
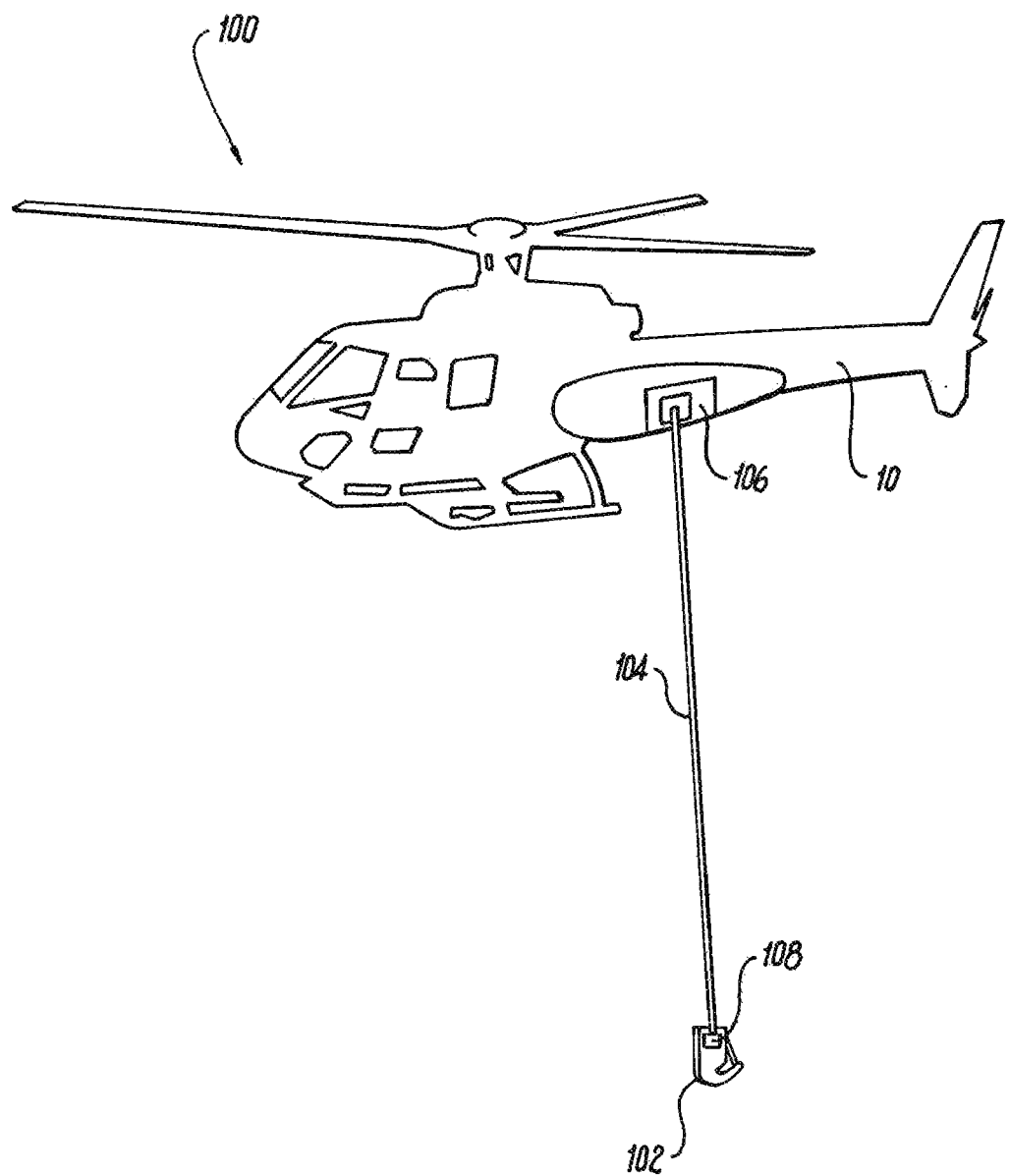
FIG. 1 is a schematic view of an exemplary embodiment of a hoist system constructed in accordance with the present disclosure, showing the hoist mounted to an aircraft.

Reference will now be made to the drawings wherein like reference numerals identify similar structural features or aspects of the subject disclosure. For purposes of explanation and illustration, and not limitation, a partial view of an exemplary embodiment of a hoist system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to monitor conditions a hook end of a hoist system with reliable data transmission in a system robust to harsh external conditions.

Hoist system 100 includes a load attaching member 102, which can include a hook or the like, a single conductor 104 connecting the load attaching member 102 to a hoist 106 for raising and lowering the load attaching member 102 and the single conductor 104. For example, the single conductor 104 can include a steel cable with multiple strands, or the like. The hoist 106 is shown mounted to an aircraft 10, such as for rescue or cargo lifting applications. However, those skilled in the art having the benefit of this disclosure will readily appreciate that a hoist system in accordance with this disclosure can readily be mounted for use in a crane (such as on a vehicle or building), a winch, an elevator, a suspension structure (such as a bridge), or in any other suitable application.

A sensor 108 is operatively connected to the load attaching member 102 to sense a monitored parameter of the load attaching member 102. The sensor 108 is electrically connected to a receiving module 110 of the hoist 106, shown in FIG. 2, for single wired-transmission along the single conductor 104 from the sensor 108 to the receiving module 110.

Figure 2:
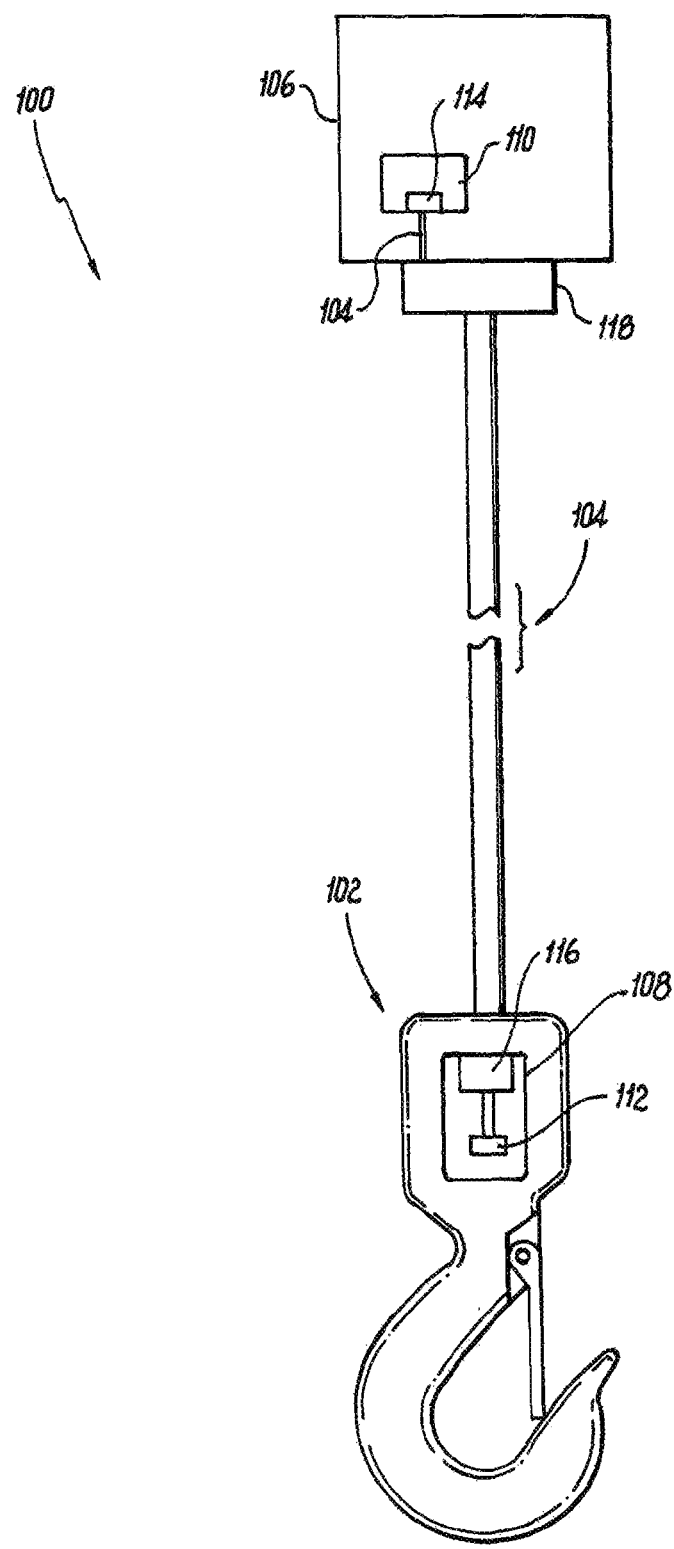
FIG. 2 is a schematic view of a portion of the system of FIG. 1, showing components of the sensor.

With reference now to FIG. 2, the sensor 108 can be configured for monitoring the monitored parameter optically and or electrically. It is also contemplated that the sensor 108 can be configured to generate analog and/or digital sensor data. For example, the sensor 108 can be configured for monitoring one or more loads on the load attaching member 102 as the monitored parameter. The sensor 108 as shown in FIG. 2 includes a stress sensing element 112, e.g., a piezo-electric element mounted to the stress bearing structure of load attaching member 102, for sensing loads locally at the load attaching member 102. The hoist system 100 includes a second and separate sensing element 114 (e.g. for cable tension) at a receiving module end of the single conductor 104 opposite the load attaching member 102 for sensing loads on the single conductor 104 proximate to the hoist 106. For example, the end of single conductor 104 to which sensing element 114 and receiving module 110 are connected can be an end of single conductor 104 on an opposite end of rotary drum 118 from load attaching member 102, where rotary drum 118 is mounted to or is part of hoist 106 for reeling in and out single conductor 104. Having sensing capability at both ends of single conductor 104 in this manner allows monitoring of loads at both the load attaching member end and the hoist end of single conductor 104, which is important in dynamics loading situations where the loads at opposite ends of the single conductor 104 are not the same.

It is possible to use sensor 108 without the need for a dedicated power supply line or battery for sensor 108. All power and/or data transmission between the sensor 108 and the receiving module 110 is conducted along a single wire, namely the single conductor 104, i.e., the same single conductor 104 that bears the load being hoisted. The single conductor 104 is connected as a monopole between the sensor 108 and the receiving module 110 without any second conductor completing a closed circuit between the sensor 108 and the receiving module 110. The single conductor 104 forms an open circuit between the sensor 108 and the receiving module 110.

The sensor 108 includes a module 116 connected to the sensing element 112 and to the single conductor 104 to gather sensor data for the monitored parameter, transform the sensor data into a wave of time-variant electrical charge densities, and transmit the wave of time variant electrical charge densities along the single conductor 104. The receiving module 110 is configured to receive the wave of time variant electrical charge densities from the single conductor 104 and extract the sensor data from the wave of time variant electrical charge densities. The receiving module 110 can be configured for health monitoring the load attaching member 102, single conductor 104, and/or hoist 106 based on sensor data from the sensor 108.

The methods and systems of the present disclosure, as described above and shown in the drawings, provide for transmission of sensor data such as in hoists with superior properties potentially including better reliability than wireless sensor systems, and more robust, e.g., in harsh environments, than systems using two wires for data transmission in a closed circuit. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A hoist system comprising:
    a load attaching member;
    a single conductor connecting the load attaching member to a hoist for raising and lowering the load attaching member and the single conductor; and
    a sensor operatively connected to the load attaching member to sense a monitored parameter of the load attaching member, wherein the sensor is electrically connected to a receiving module of the hoist for single wired-transmission along the single conductor from the sensor to the receiving module.

2. The hoist system as recited in claim 1, wherein all power and/or data transmission between the sensor and the receiving module is conducted along the single conductor.

3. The hoist system as recited in claim 1, wherein the single conductor is connected as a monopole between the sensor and the receiving module without a second conductor completing a closed circuit between the sensor and the receiving module.

4. The hoist system as recited in claim 1, wherein the single conductor forms an open circuit between the sensor and the receiving module.

5. The hoist system as recited in claim 1, wherein the sensor is configured to:
    generate sensor data for the monitored parameter;
    transform the sensor data into a wave of time-variant electrical charge densities; and
    transmit the wave of time variant electrical charge densities along the single conductor.

6. The hoist system as recited in claim 5, wherein the receiving module is configured to:
    receive the wave of time variant electrical charge densities from the single conductor; and
    extract the sensor data from the wave of time variant electrical charge densities.

7. The hoist system as recited in claim 1, wherein the sensor is configured for monitoring the monitored parameter optically.

8. The hoist system as recited in claim 1, wherein the sensor is configured for monitoring the monitored parameter electrically.

9. The hoist system as recited in claim 1, wherein the sensor is configured for monitoring one or more loads on the load attaching member as the monitored parameter.

10. The hoist system as recited in claim 9, wherein the sensor includes a stress sensing element for sensing loads locally at the load attaching member.

11. The hoist system as recited in claim 10, further comprising a second stress sensing element at a receiving module end of the single conductor opposite the load attaching member for sensing loads on the single conductor proximate the hoist.

12. The hoist system as recited in claim 1, wherein the sensor is configured to generate analog sensor data.

13. The hoist system as recited in claim 1, wherein the sensor is configured to generate digital sensor data.

14. The hoist system as recited in claim 1, wherein the hoist is configured to be mounted to at least one of an aircraft, a crane, a winch, an elevator, or a suspension structure.

15. The hoist system as recited in claim 1, wherein the receiving module is configured for health monitoring the load attaching member, single conductor, and hoist based on sensor data from the sensor.

16. An aircraft including:

an airframe; and a hoist system including:
- a load attaching member;
- a single conductor connecting the load attaching member to a hoist for raising and lowering the load attaching member and the single conductor; and
- a sensor operatively connected to the load attaching member to sense a monitored parameter of the load attaching member, wherein the sensor is electrically connected to a receiving module of the hoist for single wired-transmission along the single conductor from the sensor to the receiving module.

17. A method comprising:

transmitting data from a sensor configured to monitor at least one parameter of a hoist system along a cable having only a single conductor.

* * * * *